(12) United States Patent
Durnin

(10) Patent No.: US 8,668,617 B2
(45) Date of Patent: Mar. 11, 2014

(54) VARIABLE TRANSMISSION

(75) Inventor: Stephen John Durnin, Ormiston (AU)

(73) Assignee: VRT Innovations Limited, Queensland (AU)

( * ) Notice: Subject to any disclaimer, the term of this patent is extended or adjusted under 35 U.S.C. 154(b) by 769 days.

(21) Appl. No.: 12/680,658

(22) PCT Filed: Sep. 29, 2008

(86) PCT No.: PCT/AU2008/001442
§ 371 (c)(1),
(2), (4) Date: Sep. 16, 2010

(87) PCT Pub. No.: WO2009/039590
PCT Pub. Date: Apr. 2, 2009

(65) Prior Publication Data
US 2011/0201470 A1    Aug. 18, 2011

(30) Foreign Application Priority Data

Sep. 28, 2007  (AU) .............................. 2007905337

(51) Int. Cl.
*F16H 37/06*    (2006.01)
(52) U.S. Cl.
USPC ........................................................ 475/330
(58) Field of Classification Search
USPC ................................................. 475/329, 330
See application file for complete search history.

(56) References Cited

U.S. PATENT DOCUMENTS

| 6,958,029 B2 * | 10/2005 | Inoue ............................ 475/215 |
| 2004/0166979 A1 | 8/2004 | Dupriez |
| 2007/0240962 A1 | 10/2007 | Parthuisot et al. |

FOREIGN PATENT DOCUMENTS

| WO | 9206316 A1 | 4/1992 |
| WO | 2005119101 A1 | 12/2005 |
| WO | 2007046722 A1 | 4/2007 |

* cited by examiner

*Primary Examiner* — Erin D Bishop
(74) *Attorney, Agent, or Firm* — Laurence A. Greenberg; Werner H. Stemer; Ralph E. Locher

(57) ABSTRACT

A transmission system having an input shaft for receiving/imparting rotation into the transmission system and an output shaft for delivering rotation from the transmission system, a flywheel component which has a ring gear portion and planet gear portion, wherein rotation of the input shaft causes rotation of the flywheel component, a first transmission shaft and a first transmission component, wherein rotation and/or orbital motion of the flywheel component is affected by the rotation or non-rotation of the first transmission shaft and by the rotation or non-rotation of the first transmission component, a second transmission shaft, wherein the first transmission component rotates if the second transmission shaft rotates, a second transmission component which rotates if the second transmission shaft rotates, wherein rotation or non-rotation of the second transmission component and rotation or non-rotation of the first transmission shaft affect the overall/net output shaft rotation, at least one modulator shaft the rotation or non-rotation of which is linked with the rotation or non-rotation of one of the transmission shafts, wherein a continuously variable accelerating or retarding torque can be applied to the modulator to accelerate or retard the rotation of the transmission shaft with which the modulator is linked, whereby this continuously variable acceleration or retarding of the rotation of the transmission shaft enables continuous variation of the speed and/or direction of the output rotation relative to the input rotation.

14 Claims, 10 Drawing Sheets

VARIABLE TRANSMISSION

TECHNICAL FIELD

The present invention relates to transmission systems including, but not limited to, gearboxes.

BACKGROUND ART

In general terms, transmission systems operate to convert rotation, such as the rotation of an output shaft from an engine or other prime mover, into rotation at a different speed, or in a different direction, or both. Gearboxes are one common form of transmission system. One common use for gearboxes is to convert high-speed, low torque rotations into lower speed, higher torque rotations. Automobile gearboxes provide a good example of this.

Internal combustion engines used in conventional automobiles typically operate at engine speeds between 800 rpm and 7000 rpm. Hence, the speed of rotation delivered by the engine's output drive shaft ("crankshaft") is between 800 rpm and 7000 rpm. However, for ordinary automobiles which travel at speeds between 0 km/hr and 120 km/hr, and assuming an outer diameter for the automobile wheels (including tyres) of approximately 40 cm, the automobile's wheels are only required to rotate at between 0 rpm and 1591 rpm. Furthermore, automotive internal combustion engines typically deliver maximum torque at engine speeds somewhere in the middle of the 800 rpm-7000 rpm operating range, whereas maximum torque is usually required to accelerate the car from stationary or low speed to a higher speed. Consequently, automobiles are typically provided with a transmission system or "gearbox" to convert the high-speed, low torque rotation delivered by the engine into a lower speed, higher torque rotation suitable for propelling the automobile.

Transmission systems are also used in a large variety of other machines and other mechanical applications which utilise rotation and where it is necessary to convert the rotation to a higher or lower speed, or to change the direction of rotation. Those skilled in this area will be familiar with other applications for transmission systems and therefore further applications need not be described. Also, it will be clearly understood that the invention is in no way limited to automobiles or any other particular application, and the automobile example above is given for the sole purpose of providing one illustration of an application of transmission systems.

Many transmission systems provide more than one conversion ratio between the speed of rotation delivered by the engine or prime mover and the resultant speed/direction of rotation after the rotation has been converted by the transmission. In gearbox type transmission systems, this is achieved by providing a series of gears of differing sizes, and the overall conversion ratio can be altered by causing differently sized gears to mesh with each other, thereby giving the transmission a different "gear ratio" depending on which combination of gears is engaged. The gears are typically contained within a casing, hence the common colloquial name "gearbox" for this kind of transmission system.

One of the major problems with transmission systems such as the gearboxes described in the previous paragraph is that they generally provide only a few discrete gear ratios. This is because each of the gears inside the gearbox is fixed in size, and therefore the number of possible gear ratios is limited to the number of different possible combinations of differently sized gears that can engage with each other. As an example, most automobile gearboxes have seven or fewer gear ratios (including the reverse gear). This can lead to problems or inefficiencies in applications where the ideal ratio between the speed of the rotational input to the transmission system and the speed of the rotational output from the transmission system does not correspond with one of the discrete ratios.

It is useful to refer again to the automobile example as one possible illustration of the problem described in the previous paragraph. Situations commonly arise where the transmission ratio that would allow the automobile engine to operate at optimum fuel efficiency for a required automobile speed does not correspond with one of the possible ratios of the automobile's gearbox. Therefore, in order for the automobile to travel at that desired speed, the automobile gearbox must be placed in a gear that provides a non-ideal gearing ratio, and the automobile engine must be run at a speed higher or lower than the engine speed which would provide optimal fuel efficiency. Those skilled in this area will recognize other problems or inefficiencies in other applications which arise because of the discrete gearing ratios available with these kinds of gearboxes.

There would therefore appear to be an advantage in providing a transmission system which is not limited to discrete gearing ratios, or which at least provides a large number of gearing ratios (preferably well in excess of seven, and preferably close to each other), such that the transmission system can be placed in a condition where its input-output ratio is (or is close to) that required for a particular operating speed in a given application.

Transmission systems have been devised which are not limited to discrete gearing ratios. In general, these different transmission systems operate such that the ratio between the speed of rotation delivered by the engine or prime mover and the resultant speed/direction of rotation after the rotation has been converted by the transmission system can be varied continuously, often within a given range. In other words, they operate to provide continuous or infinite variability in the transmission system's input-output ratio, again, often within the transmission system's operating speed range.

Of the transmission systems mentioned above which provide continuous variability in the system's input-output ratio, many are based on a variable-diameter pulley or "Reeves Drive" configuration. Reeves Drive type systems have a pair of rotating pulleys (one drive/input pulley and one driven/output pulley) and a belt running between the pulleys. Each pulley has two separate sides which, when assembled together, form a V-shaped track extending around the circumference of the pulley. The separate sides of both respective pulleys can be moved closer together and further apart as described below. The belt runs around the V-shaped track in each pulley as the pulleys rotate. The belt also typically has a V-shaped cross-section so that the sides of the belt have a similar slope to that of the V-shaped tracks. This enables the sides of the belt to contact closely against the sides of the V-shaped track on each pulley, thereby minimising slip between the belt and the pulleys.

The variation in the transmission input-output ratio in these Reeves Drive type systems is achieved by moving the sides of one pulley closer together and moving the sides of the other pulley wider apart. Doing this has the effect of increasing the width of the V-shaped track on the first mentioned pulley and decreasing the width of the track on the other pulley. If the sides of the drive/input pulley are brought together and the sides of the driven/output pulley are moved apart, this forces the belt outwards on the drive/input pulley and makes the belt move around that pulley at a greater diameter, the V-shaped track on the driven/output pulley widens allowing the belt to move around that pulley at a lesser diameter. This results in the drive/input pulley doing fewer rotations for every rotation of the driven/output pulley. Hence, this causes the transmission system to convert the input prime mover rotation into rotation at a higher speed. Conversely, if the sides of the driven/output pulley are brought together and the sides of the drive/input pulley are moved apart, this has the opposite effect (i.e. it causes the transmission system to convert the input prime mover rotation to rotation at a lower speed).

Hence, moving the sides of the pulleys as described above changes the effective diameters of pulleys, and therefore changes the input-output ratio of the transmission system. Those skilled in this area will appreciate that, in these Reeves Drive type systems, the distance between the two pulleys does not change, and neither does the length of the belt, so changing the input-output ratio means both pulleys must be adjusted (i.e. the effective diameter of one must decrease if the effective diameter of the other increases) simultaneously to maintain the proper amount of tension in the belt. One of the important aspects of these systems is that, because the spacing between the sides of each pulley is not limited discrete spacings, it is possible to create continuous variation in the input-output ratio of the transmission system by varying the space between the sides of the pulleys.

It is an object of the present invention to provide an alternative form of transmission system which allows continuous variability in the system's input-output ratio, or which can at least provide a large number of gearing ratios. The transmission system of the present invention may be adapted for use in a range of applications. However, it will be clearly appreciated that any reference herein to prior or existing transmission systems or any other background material or information does not constitute an acknowledgement or admission that any transmission systems or other information of any kind, or any combination thereof, ever formed part of the common general knowledge in the field, or is otherwise admissible prior art, whether in Australia or in any other country.

DISCLOSURE OF THE INVENTION

In one form, the present invention resides broadly in a transmission system having
- rotation input means for delivering rotation ("input rotation") into the transmission system,
- a flywheel component, wherein rotation of the input means causes rotation of the flywheel component,
- rotation output means for delivering rotation ("output rotation") from the transmission system,
- transmission means for transferring rotation from the flywheel component to the output means, and
- modulation means which can rotate and the rotational velocity of the modulation means can be selectively continuously varied, wherein the rotation or non-rotation of the modulation means can interact with the transmission means and varying the rotational velocity of the modulation means can affect continuous variation in the speed and/or direction of the output rotation relative to the input rotation.

In another form, the present invention resides broadly in a transmission system having
- rotation input means for delivering rotation ("input rotation") into the transmission system,
- a flywheel component, wherein rotation of the input means causes rotation of the flywheel component,
- rotation output means for delivering rotation ("output rotation") from the transmission system,
- transmission means for transferring rotation from the flywheel component to the output means, and
- modulation means which can rotate and the rotation of the modulation means can selectively adopt a large number of velocities, wherein the rotation or non-rotation of the modulation means can interact with the transmission means, whereby different velocities of the modulation means create different ratios between the speed and/or direction of the input rotation and the output rotation.

In yet another form, the invention resides in a transmission system having
- an input shaft for delivering rotation into the transmission system,
- a flywheel component, wherein rotation of the input shaft causes rotation of the flywheel component
- an output shaft for delivering rotation from the transmission system,
- a transmission for transferring rotation from the flywheel component to the output shaft, and
- at least one modulation shaft which can rotate and the speed and/or direction of its rotation can be selectively continuously varied, wherein the rotation or non-rotation of at least the said modulation shaft can interact with the transmission and varying the speed and/or direction of the rotation of at least the said modulation shaft can affect variation in the speed and/or direction of rotation of the output shaft relative to the speed and direction of rotation of the input shaft.

In a further form, the present invention resides in a transmission system having
- an input for receiving/imparting rotation ("input rotation") into the transmission system and an output for delivering rotation ("output rotation") from the transmission system,
- a flywheel component, wherein rotation of the input causes rotation of the flywheel component
- a transmission for transferring rotation from the flywheel component to the output, the transmission incorporating a first transmission shaft and a second transmission shaft, wherein the overall/net output rotation speed and/or direction depends, at least partly, on the speed/direction of rotation of the first transmission shaft and the speed/direction of rotation of the second transmission shaft,
- a modulator associated with a least one of the transmission shafts wherein a continuously variable accelerating or retarding influence can be applied to or by the modulator to thereby accelerate or retard the rotation of at least one of the transmission shafts, the modulator thereby allowing continuous variation of the speed and/or direction of the output rotation relative to that of the input rotation.

In yet a further form, the present invention resides in a transmission system having
- an input for receiving/imparting rotation ("input rotation") into the transmission system and an output for delivering rotation ("output rotation") from the transmission system,
- a flywheel component, wherein rotation of the input causes rotation of the flywheel component,
- a first transmission shaft and a first transmission component, wherein rotation of the flywheel component is affected by the rotation or non-rotation of the first transmission shaft and by the rotation or non-rotation of the first transmission component,
- a second transmission shaft, wherein the first transmission component rotates if the second transmission shaft rotates, a second transmission component which rotates if the second transmission shaft rotates, wherein rotation or non-rotation of the second transmission component and rotation or non-rotation of the first transmission shaft affects the overall/net output rotation, at least one modulator the rotation or non-rotation of which is linked with the rotation or non-rotation of one of the transmission shafts, wherein a continuously variable accelerating or retarding torque can be applied to the modulator to accelerate or retard the rotation of the transmission shaft with which the modulator is linked, whereby this continuously variable acceleration or retarding of the rotation of the transmission shaft enables continuous variation of the speed and/or direction of the output rotation relative to the input rotation.

Like most transmission systems, transmission systems in accordance with the present invention will typically operate to convert rotation generated by a prime mover into rotation at a different speed, or in a different direction, or both. It is envisaged that the kind of prime mover with which the invention will most often be used will be an internal combustion engine or an electric motor. However, the transmission system of the present invention could alternatively be used with any other form of prime mover capable of generating rotational motion, for example windmills, water wheels, manually rotated cranks etc or a combination thereof. Other possible prime movers which could be used to drive rotation of the transmission system will be recognized by those skilled in this area.

The transmission system will incorporate means for transmitting the rotation generated by the prime mover into the transmission system. Most typically, the prime mover will have a drive shaft, crankshaft or something similar which "outputs" the rotational motion generated by the prime mover. In these cases the transmission system may be provided with an input shaft which can be connected to the drive shaft of the prime mover, or linked with that drive shaft (possibly by way of a series of linkage components or some other mechanism) so that rotation is transmitted into the transmission system via the input shaft. Therefore, an input shaft is probably the most common form of "input" or "rotation input means" that will be used with the present invention.

However, input shafts are not the only means by which the transmission system can receive rotation from the prime mover. For example, the drive shaft of the prime mover could extend directly into the transmission system, in which case one of the internal components of the transmission system (such as an internal gear or shaft etc) may incorporate a socket, slot or other aperture into which the drive shaft of the prime mover can insert, or to which the drive shaft can otherwise connect. Alternatively, an internal component in the transmission system may have a plug or protrusion of some kind which inserts into a socket in the end of the prime mover's drive shaft to thereby connect the drive shaft. In these cases, the socket, slot, plug, protrusion etc on or in the transmission system's internal component is the "input" or "rotation input means" which delivers rotation from the prime mover into the transmission system. Other rotation input means may be used as well, for example hydraulic linkages. Further possible rotation input means or mechanisms (or combination thereof) will be known to those skilled in the art, and any such means fall within the scope of the invention.

The transmission system will also incorporate means for "outputting" or delivering the rotation which has been transmitted and possibly converted by the transmission system. In other words, the transmission system will have means for conveying the rotation to whatever rotational machine or other apparatus the transmission system is being used to drive. Similar considerations apply to this "output" or "rotation output means" as were discussed above in relation to the rotation input means. Therefore, the transmission system will most typically be provided with an output shaft which can be connected to the machine/apparatus which the transmission system is driving, or somehow linked with that machine/apparatus (possibly by way of a series of linkage components or some other mechanism) so that rotation is transmitted into the machine/apparatus. However, any of the possible mechanisms or arrangements discussed above in relation to the rotation input means may equally be used for the rotation output means.

The transmission system of the present invention has a "transmission" or "transmission means" for transferring rotation from the transmission system input to the transmission system output. It also has a "modulator" or "modulation means" which can rotate and which affects the operation of the transmission. In some embodiments, the modulation means may be able to selectively adopt a large number of discrete angular velocities. In this regard, the modulation means should be able to adopt more than 6 discrete rotational velocities, preferably more than 10, and possibly more than 50. However, in other (probably more preferred) embodiments, the rotational velocity of the modulation means may be selectively and continuously variable. In other words, it may be able to adopt an infinite number of velocities, possibly within a given operating range for the transmission system. As noted above, the rotation of the "modulator" or "modulation means" interacts with the "transmission" or "transmission means". Where the rotation of the modulation means can adopt a large number of discrete velocities, the different velocities of the modulation means may create different ratios between the speed and/or direction of the transmission system's input rotation and output rotation. Where the rotational velocity of the modulation means can be continuously varied, varying the rotational velocity of the modulation means may enable continuous variation in the speed and/or direction of the output rotation relative to the input rotation.

As mentioned in the previous paragraph the transmission system has a "transmission" or "transmission means" (this will be referred to simply as the "transmission" from now on). The transmission will preferably incorporate a first transmission shaft and a second transmission shaft, and the overall/net output rotation speed and/or direction will depend, at least partly, on the difference between the rotational speed/direction of the first transmission shaft and the rotational speed/direction of the second transmission shaft. As also noted above, the rotation of the "modulator" or "modulation means" (which will be referred to simply as the "modulator" from now on) interacts with the transmission to vary the speed/direction of the transmission system's output rotation relative to its input rotation. Preferably, the modulator may do this by varying the speed/direction of rotation of at least one of the transmission shafts.

Like the input and output means discussed above, the modulator may take a wide variety of forms. It is envisaged that the modulator, or each modulator, will usually comprise a modulation shaft which can rotate. The rotation of a modulation shaft may be linked to the rotation of at least one of the transmission shafts such that rotation of that modulator affects the rotation of at least one of the transmission shafts. However, the modulator need not take the form of a modulator shaft or shafts, and indeed it could take a range of other forms. For example, the modulator could comprise some other form of rotating component (such as, for example, a pulley or roller, or a spinning belt or chain etc), and its rotation may be associated with the rotation of one of the transmission shafts by way of a belt, chain, hydraulic linkage, inter-engaging gears, sprocket magnetic or electric coupling, or any other device/mechanism capable of achieving a similar result. Nevertheless, as stated above, the (or each) modulator will typically take the form of a rotatable modulator shaft.

In preferred embodiments of the invention, a modulator shaft may be provided for each of the first and second transmission shafts. Hence, a first modulator shaft may be provided, the rotation of which is linked with the rotation of the first transmission shaft, and a second modulator shaft may be provided, the rotation of which is linked with the rotation of the second transmission shaft. In particularly preferred embodiments, the first modulator shaft may have a bevel gear which engages with a corresponding bevel gear on the first transmission shaft, and the second modulator shaft may have a bevel gear which engages with a corresponding bevel key on the second transmission shaft. Hence, acceleration/deceleration applied to the first modulator shaft will be transmitted via the engagement of the bevel gears to cause corresponding acceleration/deceleration of the first transmission shaft. Similarly, acceleration/deceleration applied to the second modulator shaft will cause corresponding acceleration/deceleration of the second transmission shaft.

The transmission system may be provided with a flywheel component. The flywheel component will preferably be functionally linked with the transmission system input such that rotation of the input (i.e. the input rotation) causes rotation of the flywheel component. The flywheel component could be functionally linked with the input by way of belts, gears, pulleys, chains etc. However, more preferably, the flywheel component will incorporate a ring gear portion, and the input will comprise an input shaft with an input gear fixedly mounted on the input shaft such that the input gear rotates with, and at the same speed as, the input shaft. Suitably, the input gear may engage with the ring gear portion on the flywheel component such that rotation of the input shaft causes rotation of the flywheel component. In these embodiments, the diameter of the ring gear portion of the flywheel component will be larger than that of the input gear. Consequently, whilst the engagement of the input gear with the ring gear portion on the flywheel component will cause rotation to be imparted into the flywheel component, the rotation of the flywheel component will be slower than that of the input shaft.

The "transmission" of the transmission system may also incorporate a first transmission component and a second transmission component. Preferably, both the first and second transmission components will be functionally linked with the second transmission shaft such that both transmission components rotate if the second transmission shaft rotates. The first and second transmission components could be functionally linked with the second transmission shaft by way of belts, gears, pulleys, chains, magnetic couplings etc. Also, one of the transmission components could be functionally linked with the second transmission shaft in one way, and the other transmission component could be functionally linked with the second transmission shaft in another way. However, in preferred embodiments, each transmission component will incorporate a ring gear portion, and the second transmission shaft will have separate spur-gear portions—one spur-gear portion adapted to engage with the ring gear portion on the first transmission component and another spur-gear portion adapted to engage with the ring gear portion on the second transmission component. Preferably, the spur-gear portions of the second transmission shaft may comprise spur gears fixedly mounted on either end of the second transmission shaft. The first and second transmission components may be disposed on either end of the second transmission shaft (i.e. so that the second transmission shaft is positioned between the transmission components), and the ring gear portions on the transmission components may be formed on the respective parts of the transmission components which face towards the second transmission shaft.

The diameter of the ring gear portion of each transmission component will typically be greater than the diameter of the spur-gears on the second transmission shaft. Consequently, whilst the engagement of the respective spur-gears on the second transmission shaft with the ring gear portions on the respective first and second transmission components will cause the rotation of the second transmission shaft to be transmitted into the first and second transmission components, the rotation of each transmission component will be slower than the rotation of the second transmission shaft.

The first transmission component may also be functionally linked with the flywheel component such that the rotation or non-rotation of the first transmission component effects the motion of the flywheel component. This functional link may be achieved by way of belts, gears, pulleys, chains, magnetic couplings etc. Preferably, the flywheel component may have a spur-gear type planet gear portion, and the first transmission component may have a ring gear portion. This may be the same as the ring gear portion of the first transmission component mentioned in the previous two paragraphs, or a separate ring gear portion of the first transmission component. In any event, the planet gear portion of the flywheel component may engage with a ring gear portion of the first transmission component. In particularly preferred embodiments, if the rotation of the first transmission component causes the tangential speed of the teeth on its ring gear portion to be the same as the tangential speed of the teeth on the rotating planet gear portion of the flywheel component, this may cause the flywheel component to rotate about its principal axis only. However, if the rotation of the first transmission component causes the tangential speed of the teeth on its ring gear portion to be different to the tangential speed of the teeth on the rotating planet gear portion of the flywheel component, this may cause the flywheel component to move in an orbital fashion, in addition to rotating about its own principal axis.

Those skilled in this area will appreciate that ring gears typically comprise a ring with a series of gear teeth extending around the ring, wherein the gear teeth are oriented radially inwards towards the principal cylindrical axis of the ring. However, in this specification, unless the context otherwise requires, the term "ring gear" should be understood as referring to not only this traditional form of ring gear, but possibly also a gear which comprises a ring with a series of gear teeth extending around the outside of ring, such that the gear teeth are oriented radially outwards (i.e. so that the teeth point away from the principal cylindrical axis of the ring).

The first transmission shaft may also be functionally linked with the flywheel component such that the rotation or non-rotation of the first transmission shaft effects the motion of the flywheel component. This functional link may be achieved by way of belts, gears, pulleys, chains, magnetic couplings etc. Preferably, the first transmission shaft may have a gear portion (such as a spur-gear type sun gear mounted on one end of the first transmission shaft) which engages with the planet gear portion on the flywheel component.

In preferred embodiments, rotation or non-rotation of the second transmission component and rotation or non-rotation of the first transmission shaft affects the overall/net rotation delivered by the output of the transmission system. Suitably, the first transmission shaft may be similar to the second transmission shaft insofar as it may have a spur gear fixedly mounted on either end. In particularly preferred embodiments, the first transmission shaft may be coaxial with the first and second transmission components, and an elongate shaft portion of the first transmission shaft may extend through axial holes in each of the first and second transmission components.

In particularly preferred embodiments, the transmission output may comprise an output shaft, and the output shaft may have stepped configuration. In particular, the output shaft may have an elongate portion which is co-axial with the first transmission shaft and therefore rotates about a common axis to the first transmission shaft, and an eccentric portion which orbits about that common axis as the output shaft rotates. Preferably, a spur-gear type planet gear (an output planet gear) may be pivotally mounted on the eccentric portion of the output shaft. The output planet gear may engage with a ring gear portion of the second transmission component (this may be the same ring gear portion of the second transmission component as discussed above or a separate ring gear portion of the second transmission component), and the output planet gear may also engage with a gear on the end of the first transmission shaft.

In the particularly preferred embodiments discussed in the previous paragraph, if the rotation of the second transmission component causes the tangential speed of the teeth on its ring gear portion to have the same magnitude but opposite direction to the tangential speed of the teeth of the rotating gear on the first transmission shaft, then because the output planet gear engages with both this ring gear portion and this gear on the first transmission shaft, therefore in this situation the output planet gear will rotate about its principal axis only. However, if the rotation of the second transmission component causes the tangential speed of the teeth on its ring gear portion to be different to the tangential speed of the teeth of the rotating gear on the first transmission shaft (whether a different magnitude, different direction or both), this may cause the output planet gear to move in an orbital fashion, in addition to rotating about its own principal axis. Then, because the eccentric portion of the output shaft is pivotally connected to the output planet gear, this orbital motion of the output planet gear may cause the eccentric portion of the output shaft to move in the same orbital way, although, because of the pivotal connection between the output planet gear and the output shaft, the output shaft only follows the output planet gear's orbital motion, not the output gear's rotation about its own principal axis. The orbital motion of the eccentric portion of the output shaft may therefore cause rotation of the portion of the output shaft which is coaxial with the first transmission shaft, and in this way rotation may be delivered out of the transmission system.

The present invention may be further illustrated by way of the following examples:

A kinematic analysis of a transmission system according to an embodiment of the present invention was carried out. A form of the transmission system is illustrated in FIG. 10. The input end of the transmission system was provided with a small DC motor with an integral reduction gearset to drive an input shaft, allowing the input shaft to be driven at effectively constant speed over a range of loads, making it simple to investigate and demonstrate different operating regimes.

The output was a hand wheel. Two control wheels were provided, with each control wheel mechanically connected to its own intermediate shaft in the transmission via right-angle bevel gears. Control I wheel was attached to gears meshing with ring gears while Control II wheel was attached to sun gears. The relationship between the two controls is fixed such that a given Output/Input ratio can be achieved either by driving one control at a particular speed or by driving the other control at a (different) particular speed.

The kinematic analysis of the mechanism has provided two equations enabling the Output speed to be calculated based on the Input speed and the Control speed. The form of the equations shows that whether Control I or Control II is used, the Output is the weighted sum of the Input and the Control. This highlights the "summing" characteristic of epicyclic gearsets:

$$\text{Output} = 0.375 \times \text{Control } I - 0.125 \times \text{Input} \quad \text{(Eq 1)}$$

$$\text{Output} = 0.75 \times \text{Control } II + 0.25 \times \text{Input} \quad \text{(Eq 2)}$$

Table 1 outlines some of the possible kinematic states of the transmission, achieved by driving Control I or Control II at speeds between −Input and +Input. The values shown indicate the number of revolutions achieved by the transmission element for a single revolution of the Input shaft, or correspondingly, the speed of the transmission element if the Input shaft has a speed of 1. Each of the kinematic scenarios (a) to (e) has a different Control speed. The speed of the ring gear element is also shown in the table.

| Scenario | Input Speed | Control I Speed | Control II Speed | Ring Gear Speed | Output Speed | Output/Input Ratio |
|---|---|---|---|---|---|---|
| (a) | 1 | −1 | −1 | −0.333 | −0.5 | −0.5 |
| (b) | 1 | 0 | −0.5 | 0 | −0.125 | −0.125 |
| (c) | 1 | 0.333 | −0.333 | 0.111 | 0 | 0 |
| (d) | 1 | 1 | 0 | 0.333 | 0.25 | 0.25 |
| (e) | 1 | * | 1 | 1 | 1 | 1 |

The information in table 1 may also be represented graphically as shown in FIG. 11.

All the scenarios except (c) are achievable by driving a Control at a speed of 0 or ±1. These scenarios can be achieved mechanically by physically braking the Control onto the gearbox chassis so it is a fixed stationary element (for a Control speed of 0) or by coupling the Control directly (via clutch) to the Input or to a counter-rotating Input (for Control values of ±1).

Beneficial features of Control I and Control II are the "one-sided operation" and "wide range" respectively. Conceivably, these features could be combined in a multi-Control strategy, as shown graphically in FIG. 12.

Referring to this chart, it is assumed that each Control can only be driven between speeds of 0 and +Input. In this case, Control I could be used to achieve reverse, neutral gearing and low ratios, while Control II could use to achieve low to high ratios. This could be implemented mechanically with a clutch designed to selectively couple some external variable-speed device (such as a CVT) to either Control I or Control II. The simplest CVTs do not allow both negative and positive ratios, so using this multi-Control strategy would eliminate the requirement for the external variable-speed device to produce both negative and positive ratios. This could allow for a simpler mechanical product than would be possible using Control I or Control II alone

BRIEF DESCRIPTION OF DRAWINGS

One embodiment of the invention will now be described with reference to the drawings. However, it will be clearly understood that the invention is not necessarily limited to or by the particular features of the embodiment described. In the drawings.

MODE(S) FOR CARRYING OUT THE INVENTION

Figure 1:
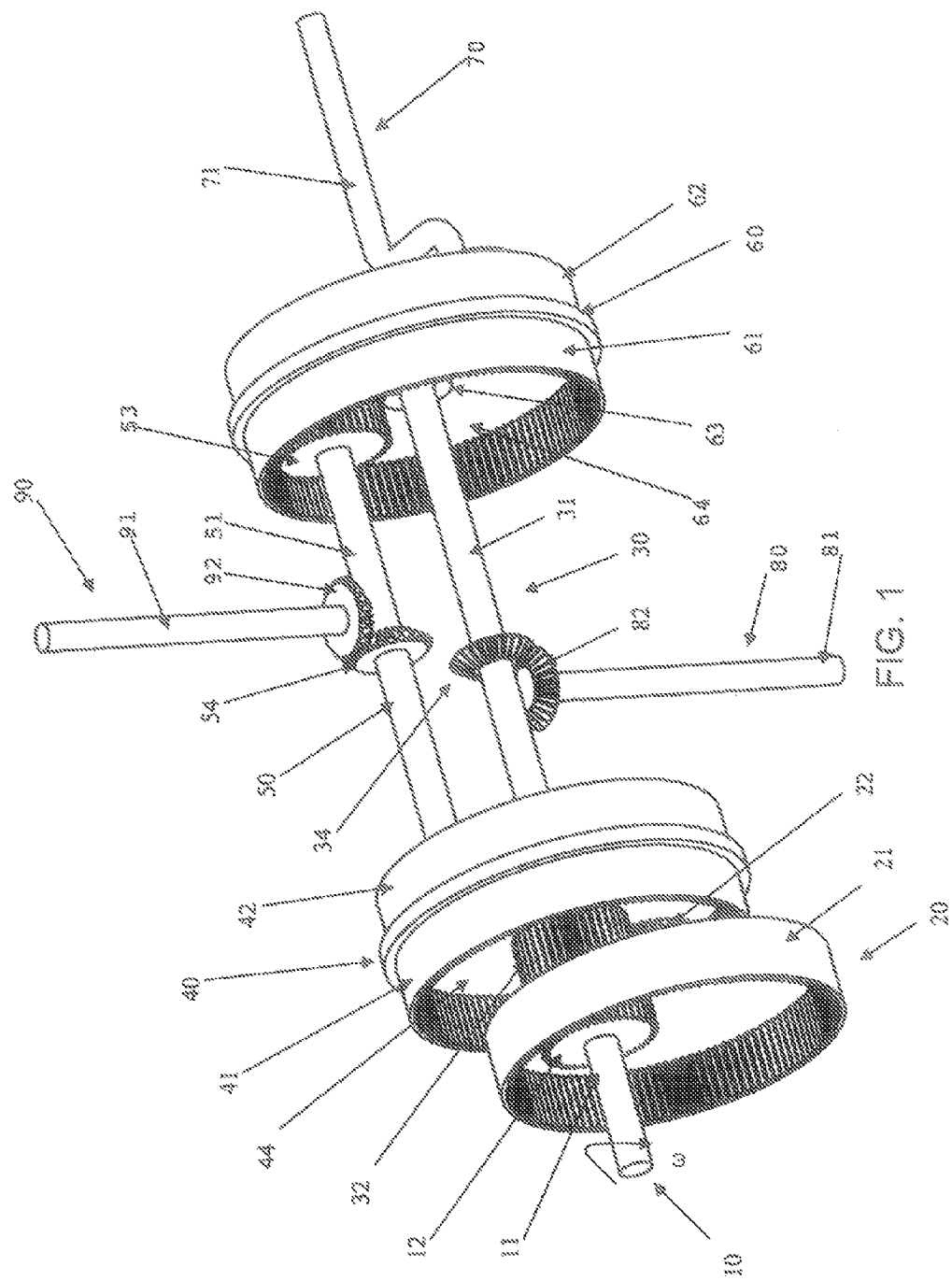
FIG. 1 is a perspective view of a variable "gearbox" type transmission system in accordance with the embodiment of the invention presently described.

From the drawings it can be seen that the variable gearbox includes the following components:

An input component 10 which is made up of an input shaft 11 and an input gear 12. The input gear 12 is a spur gear and is rigidly connected on the inward end of input shaft 11 such that the input gear 12 rotates with, and at the same rotational speed as, the input shaft 11.

A "flywheel" component 20 which comprises a ring gear portion 21 (the "flywheel ring gear") and a spur-type planet gear portion 22 (the "flywheel planet gear"). The flywheel planet gear 22 is attached to the flat back face of flywheel component 20, and is coaxial with flywheel ring gear 21, such that the flywheel planet gear 22 rotates with, and at the same speed as, the flywheel ring gear 21.

A first transmission shaft 30 which is made up of an elongate rigid shaft portion 31, a spur-type input side sun gear 32 and a spur-type output side sun gear 33. The input side sun gear 32 is fixedly connected on the end of the shaft 31 closest to the input component 10, and the output side sun gear 33 is fixedly connected on the other end of the shaft 31. Hence, the shaft 31, input side sun gear 32 and output side sun gear 33 all rotate together at the same speed. The shaft 31 extends through axial holes in the transmission components as described further below. The first transmission shaft 30 also has a bevel gear 34 fixedly mounted midway along the shaft portion 31, and the function of this will also be described further below.

A first transmission component 40 which is generally cylindrical with a dividing wall 44 which separates the component into two circular halves. The first half forms a first input side ring gear 41 and the other half forms a first output side ring gear 42. The dividing wall 44 contains an axial through-hole 43 through which the shaft portion 31 of first transmission shaft 30 extends.

A second transmission shaft 50 which is made up of an elongate rigid shaft portion 51, a spur-type input side gear 52 (not to be confused with the input gear 12) and a spur-type output side gear 53 (not to be confused with the output planet gear 72 below). The input side gear 52 is fixedly connected on the end of the shaft 51 closest to the input component 10, and the output side gear 53 is fixedly connected on the other end of the shaft 51. Hence, the shaft 51, input side gear 52 and output side gear 53 all rotate together at the same speed. The second transmission shaft 50 also has a bevel gear 54 mounted midway along the shaft portion 51, and the function of this will be described further below.

An output component 70 which is made up of a stepped output shaft 71 and a spur-type output planet gear 72. Importantly, the output component 70 differs from the input component 10 not only in that the output shaft 71 has a stepped shape whereas the input shaft 11 is straight, but also in that the output shaft 71 is pivotably connected to the output planet gear 72 whereas the input gear 12 is rigidly connected to the input shaft 11. Because the output planet gear 72 is pivotably connected to the inward end of the output shaft 71, it is possible for the output planet gear 72 to rotate while the output shaft 71 remains stationary.

A first modulator 80 which comprises a modulator shaft 81 with a modulator bevel gear 82 fixed on one end. The first modulator bevel gear 82 meshes with the bevel gear 34 on first transmission shaft 31. The function of this will be described below.

A second modulator 90 which, like the first modulator 80, comprises a modulator shaft 91 with a modulator bevel gear 92 fixed on one end. Again, the second modulator bevel gear 92 meshes with the bevel gear 54 on the second transmission shaft 51, and the function of this will be described below.

In practice, the variable gearbox in the drawings would also incorporate a number of other components which have not been shown. For example, the gearbox components would normally be contained within a casing. The casing would typically form a shell around the gearbox components, but with openings or connection means to allow the input shaft 11, output shaft 71, first modulator shaft 81 and second modulator shaft 91 to connect to driving or driven components external of the gearbox. Various mounts, bearings, fastening means and the like would also be provided inside the gearbox casings to mount the various gearbox components in position within the casing. In this regard, it will be appreciated that most of the components in the gearbox are "fixed", by which it is meant that they can rotate about their respective principal cylindrical axes as required in the operation of the gearbox, but are restrained from any other form of movement. There are some exceptions to this however. For example, the output planet gear 72 may (in some instances—depending on how the gearbox is being operated to vary the input-output ratio) move in an orbital path around output side sun gear 33 in addition to rotating about its own principal axis. This kind of orbital motion is quite common in planetary gear arrangements. Also, the flywheel component 20 is a "floating" component and may therefore (again, depending on how the gearbox is being operated to vary the input-output ratio) move in an orbital manner as the flywheel planet gear 22 moves around the input side sun gear 32. The movement of the various components will be described in further detail below.

The prime mover which generates the rotation (e.g. an internal combustion engine or an electric motor) will have its drive shaft connected in some way to input shaft 11 so that the prime mover's rotation causes rotation of input shaft 11, thereby delivering rotation from the prime mover into the gearbox. Rotation of input shaft 11 causes corresponding rotation of input gear 12. The outwardly extending spur-gear teeth on input gear 12 mesh with the inwardly extending ring-gear teeth on flywheel ring gear 21 such that the rotation is transmitted into the flywheel component 20.

At this point it is useful to note that, in the particular embodiment shown in the drawings, the various "ring gear" type components have a diameter that is three times larger than that of the various spur-type gears. Viewed another way, each of the ring gear type components has triple the number of teeth of the various spur-gear type components.

For the purposes of initial explanation it is useful to first note that the above-mentioned rotation of input shaft 11 and input gear 12 causes the flywheel component 20 to rotate in the same direction due to the meshing of the input gear teeth with the teeth of flywheel ring gear 21. The flywheel component 20 will rotate more slowly than the input shaft because its diameter is (three times) larger than that of the input gear 12. Also, this rotation may be only one component of the flywheel component's overall/net movement.

It will be recalled that the flywheel planet gear 22 is fixedly attached on the back face of the flywheel component 20. Therefore, the flywheel planet gear 22 will rotate with the same speed and direction as the rest of the flywheel component 20.

As shown in FIG. 1, the flywheel planet gear 22 in turn engages with both the input side sun gear 32 (which is connected to first transmission shaft 31) and also the first input side ring gear 41 (which is part of first transmission component 40). Therefore, the rotation of the flywheel component 20 can impart rotation into both the first transmission shaft 30 and the first transmission component 40. However, whether rotation is imparted into both or either of these components will depend on whether any accelerating or retarding torques are being applied to the modulators, or what combination of acceleration or deceleration is being applied to the modulators. This will be explained further below.

For the purposes of initial explanation, it is useful to consider the situation where no accelerating or retarding torque is applied to either of the modulators. Therefore, each modulator will rotate with the rotation of the corresponding transmission shaft with which it engages. In this situation, the rotation of the flywheel component 20 imparts rotation into both the input side sun gear 32 and the first input side ring gear 41. Hence, both first transmission shaft 30 and first transmission component 40 will rotate. Let it be assumed that the rotation of input shaft 11 is in the direction shown by the arrow in FIG. 1, at a rotational velocity $\omega$ (hence rotation at the same speed but in the opposite direction is denoted $-\omega$). The input gear 12 will also rotate with angular velocity $\omega$. However, the rotation of flywheel component 20 will be slower, at a velocity of $\omega/3$ because its diameter is three times larger than that of the input gear 12. Hence, the rotation of flywheel planet gear 22 will also be at a rotational velocity of $\omega/3$.

In the situation where no accelerating or retarding torque is applied to either of the modulators, the rotation of the first transmission component 40 will be slower than the rotation of flywheel component 20, but in the same rotational direction. More specifically, the first transmission component 40 will rotate with angular velocity $\omega/9$ because its diameter is three times greater than the diameter of flywheel planet gear 22. Conversely, the rotation of the input side sun gear 32 will be at the same speed as the rotation of the flywheel component 20 (because the planet gear 22 and sun gear 32 have the same diameter), but in the opposite direction to the flywheel component. Hence, the input side sun gear 32 will rotate at rotational velocity $-\omega/3$.

Figure 2:
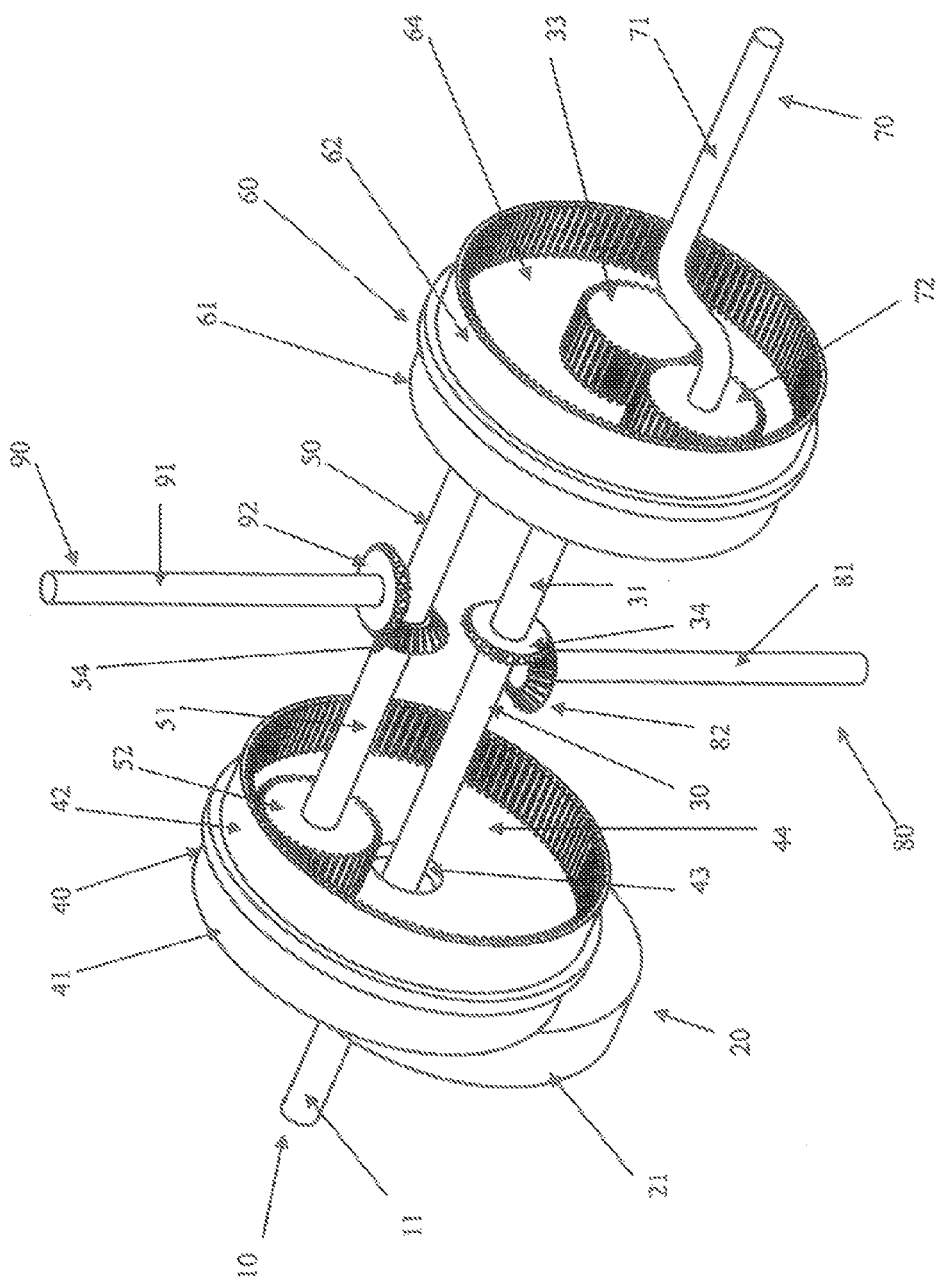
FIG. 2 is a perspective view of the variable gearbox from a slightly different angle to FIG. 1.
Figure 3:
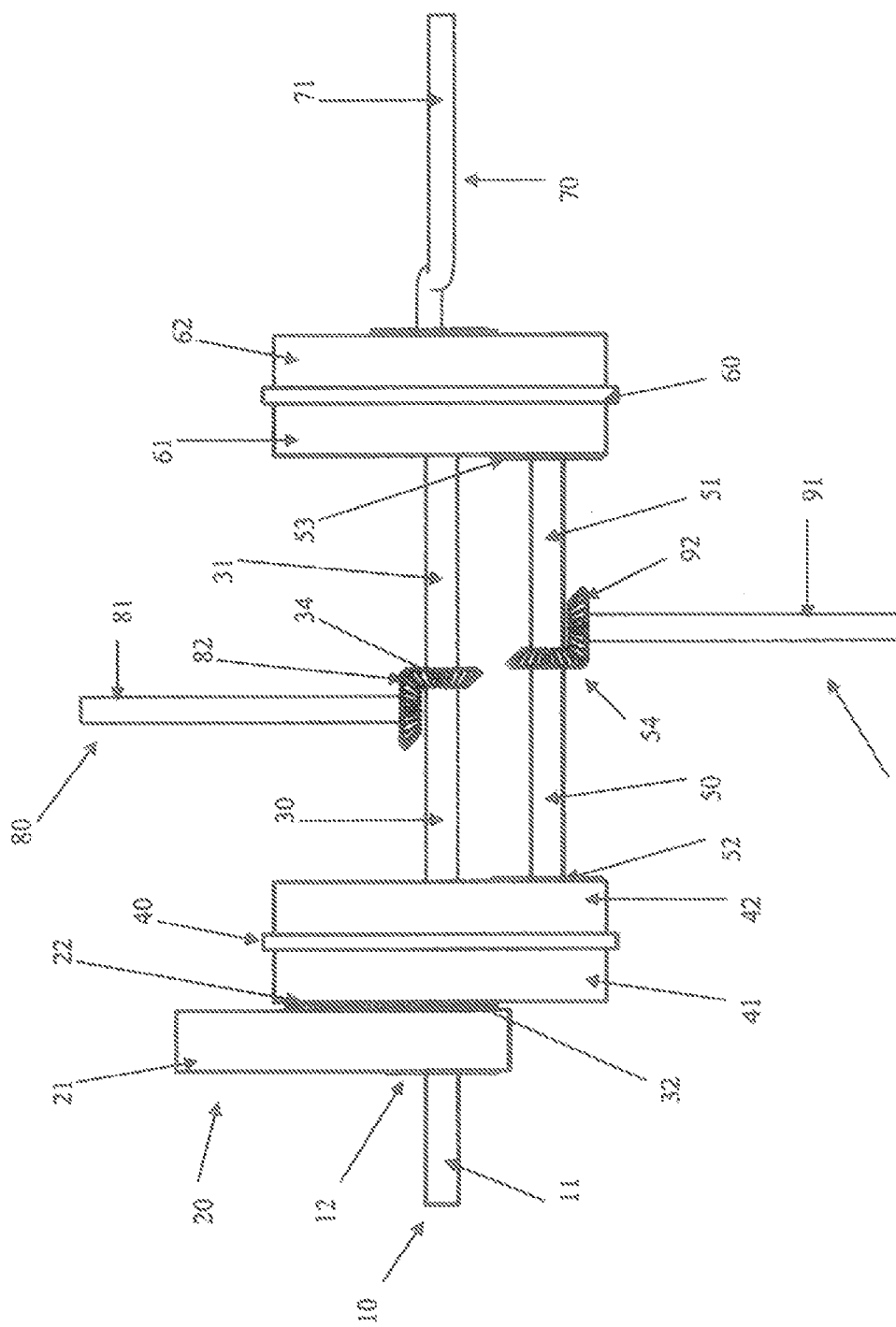
FIG. 3 is a side view of the variable gearbox.
Figure 4:
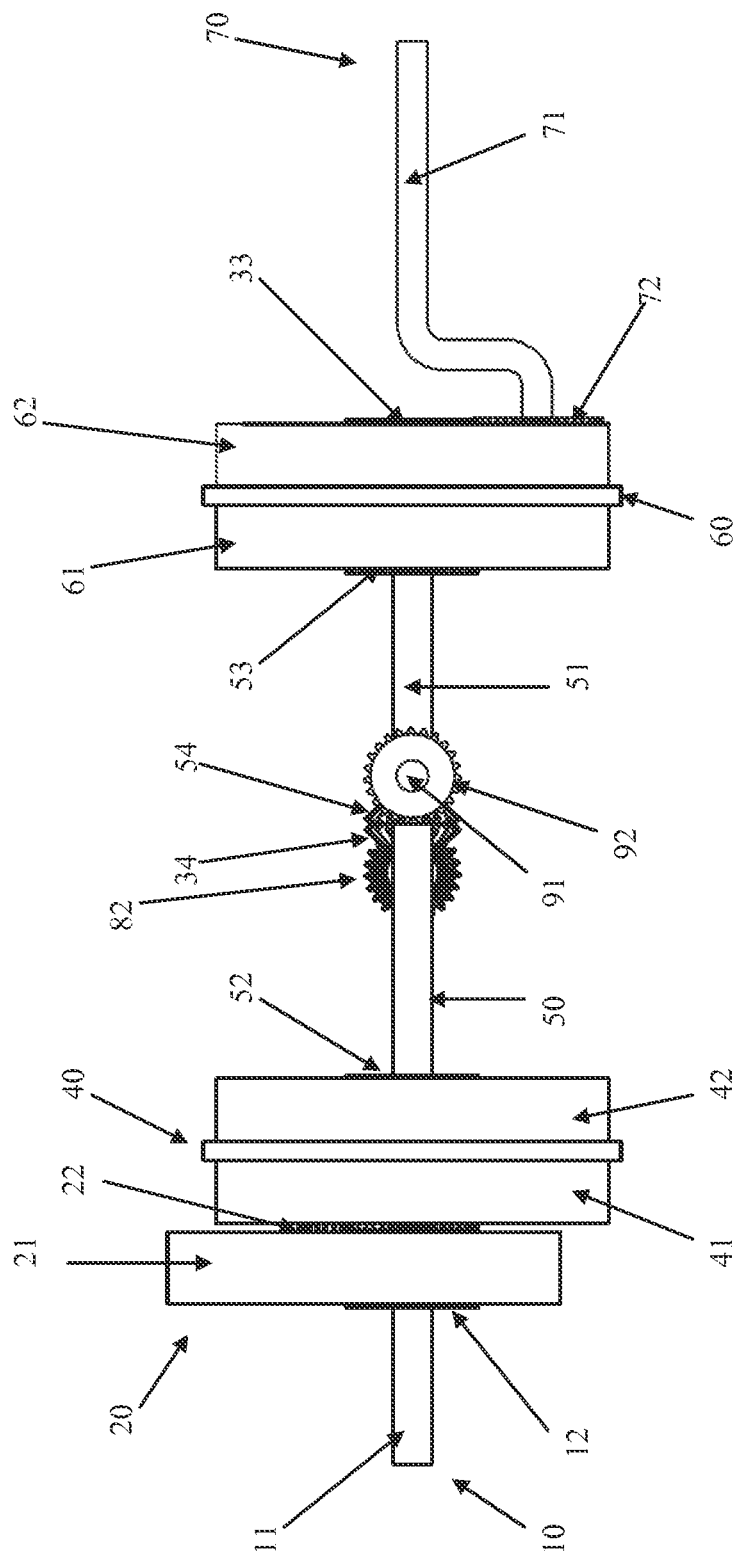
FIG. 4 is a top view of the variable gearbox.
Figure 6:
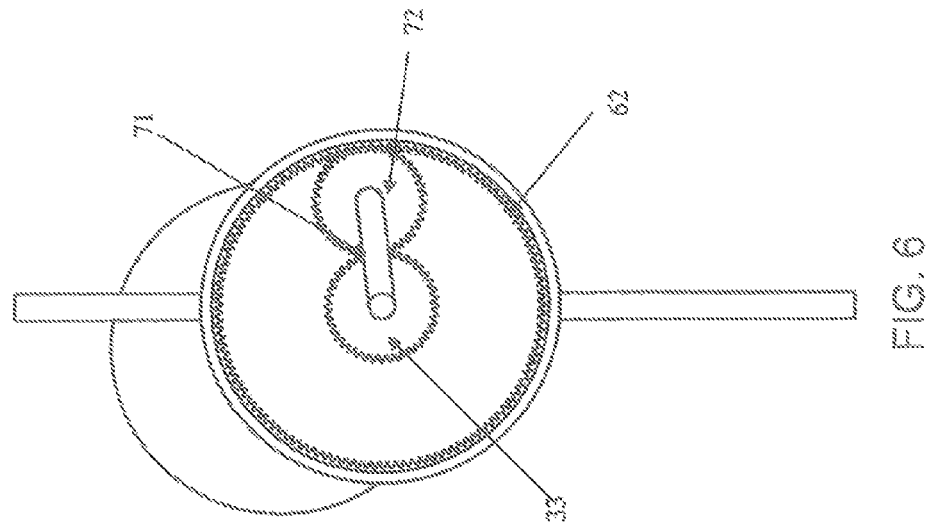
FIG. 6 is an end-on view of the opposite side of the variable gearbox to that shown in FIG. 5.
Figure 5:
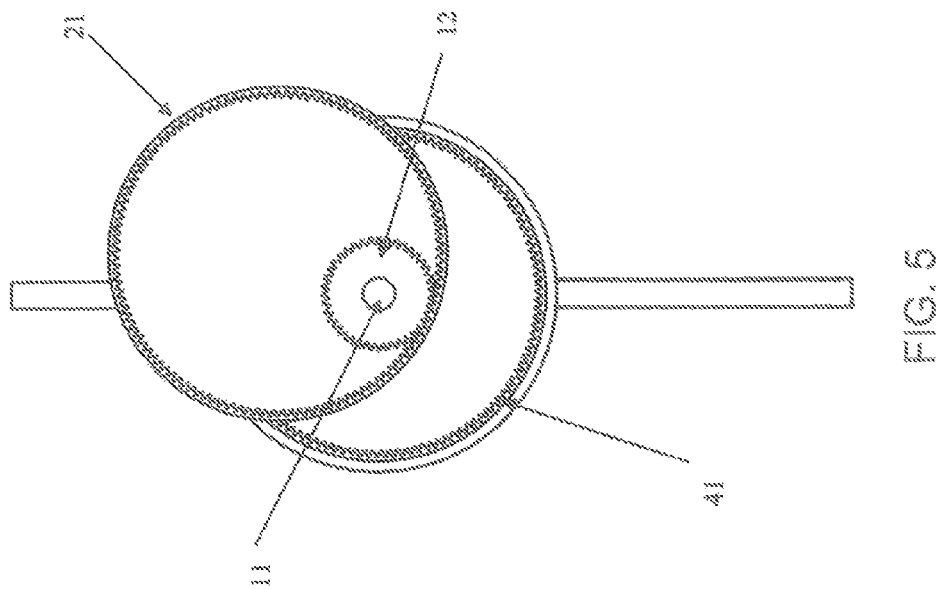
FIG. 5 is an end-on view of the variable gearbox.

The input side sun gear 32 attaches directly to the first transmission shaft 31, and from FIG. 2, it can be seen that the first transmission shaft 31 extends unimpeded through the hole 43 in the centre of the first transmission component 40.

Similarly, the other end of the first transmission shaft 31 extends unimpeded through the hole 63 in the second transmission component 60, as shown in FIG. 1. Consequently, the rotation discussed in the previous paragraph which is imparted into the input side sun gear 32 will be transmitted into the other parts of the first transmission shaft 30. In other words, the first transmission shaft 31, the bevel gear 34 and the output end sun gear 33 will all rotate at the same speed and in the same direction as the input side sun gear 32, namely $-\omega/3$. It will be recalled that the situation presently being considered is where no acceleration/deceleration is applied to either of the modulators, and therefore the first modulator 80 will rotate as the rotation of the first transmission shaft 30 just described is transmitted into it via first modulator bevel gear 82. The first modulator 80 is oriented at right angles to the first transmission shaft 30. Therefore, the simple +/− sign convention established above for rotation direction does not apply to the first modulator 80 (or the second modulator 90 for the same reason). However, the number of teeth on first modulator bevel gear 82 is the same as the number of teeth on the bevel gear 34, and therefore the magnitude of the rotational speed of first modulator 80 is $|\omega/3|$.

As noted above, in the situation where no acceleration/deceleration is applied to either of the modulators, the rotation of the flywheel component 20 causes rotation of the first transmission component 40 at a rotational velocity of $\omega/9$. From FIG. 2, it will be seen that the input side gear 52 engages with the inwardly extending teeth of the first output side ring gear 42. Consequently, the rotation of the first transmission component 40 causes rotation of the input side gear 52. The diameter of the input side gear 52 is one third of the diameter of the first output side ring gear 42. Therefore, the input side gear 52 will rotate in the same direction as the first output side ring gear 42, but at three times the speed, hence at a velocity of $\omega/3$.

The input side gear 52 is fixedly connected on the end of the second transmission shaft 50. Therefore, the rotation of the input side gear 52 causes the other parts of the second transmission shaft 50 (namely the second transmission shaft 51, the output side gear 53, and the bevel gear 54) to rotate at a velocity of $\omega/3$. The second modulator 90 will also rotate as the rotation of the second transmission shaft 50 just described is transmitted into it via second modulator bevel gear 92. The magnitude of the rotational velocity of the second modulator 90 is $|\omega/3|$.

It is useful to note at this point that, in this situation where the input shaft 11 is rotating at velocity $\omega$ and no acceleration/deceleration is applied to either of the modulators, the first transmission shaft 30 rotates at a velocity of $-\omega/3$, whereas the second transmission shaft 50 rotate at a velocity of $\omega/3$. In other words, the transmission shafts are rotating at one third of the speed of the input rotation, but in opposite directions.

Referring again to FIG. 1, it will be seen that the output side gear 53 (which is part of the second transmission shaft 50) engages with the second input side ring gear 61 on the second transmission component 60. This causes in the second transmission component to rotate in the same direction as the second transmission shaft 50, but at one third of the speed (because the diameter of the second transmission component 60 is three times that of the output side gear 53). Hence, the second transmission component is caused to rotate at a velocity of $\omega/9$.

Meanwhile, it will be recalled that the end of the first transmission shaft 30 which is oriented towards the output side of the gearbox passes through an axial hole 63 in the second transmission component 60. The output side sun gear 33 is mounted on that end of the first transmission shaft 30, as shown in FIG. 2. The output side sun gear 33 engages with the output planet gear 72. However, the output planet gear 72 also engages with the second output side ring gear 62 on second transmission component 60. Therefore, the output planet gear 72 engages with both the output side sun gear 33 and the second output side ring gear 62.

From above, it will be recalled that the output side sun gear 33 (and indeed the entire first transmission shaft 30) is rotating at a velocity of $-\omega/3$. Also, it will be recalled that the second transmission component 60 is rotating at a velocity of $\omega/9$. However, the diameter of the second transmission component 60 is three times greater than the diameter of the output side sun gear 33. Therefore, the tangential velocity at which the teeth of the output side sun gear 33 engage with the output planet gear 72 has exactly the same magnitude as the tangential velocity at which the teeth of the second output side ring gear engage with the output planet gear 72. The effect of this is that the output planet gear 72 will simply "stay in one spot" and rotate only about its own principal axis without moving in an orbital path around the output side sun gear 33. Also, because the output planet gear 72 is pivotably connected to the output shaft 71, the output shaft 71 remains stationary when the output planet gear 72 rotates in one spot like this. The only way the output shaft 71 can rotate is if the output planet gear moves in an orbital path around the output side sun gear 33.

Figure 7:
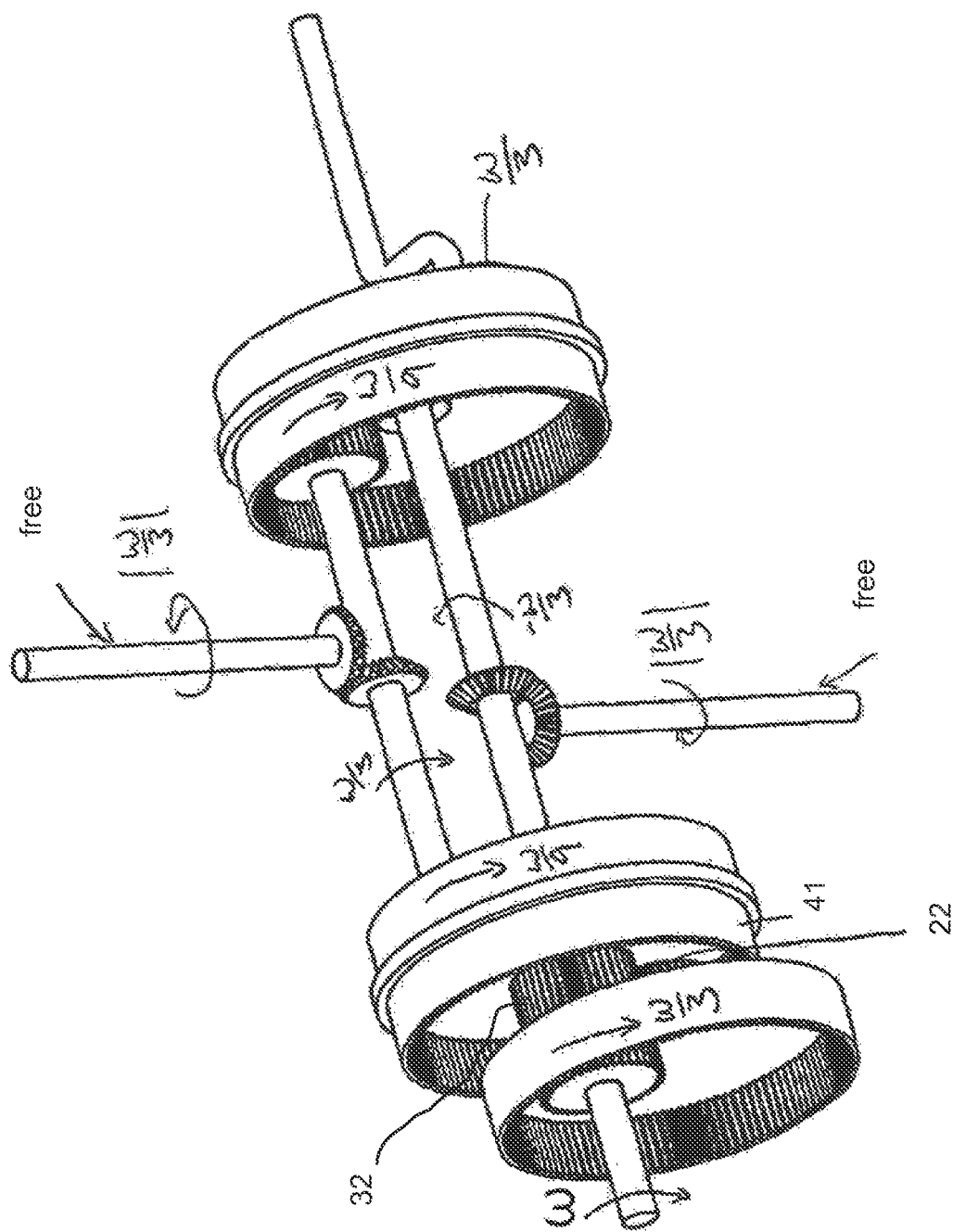
FIGS. 7-9 are perspective views of the gearbox identical to FIG. 1, but with markings indicating the rotational speed for the various component when different acceleration/deceleration is applied to the modulator shafts.

Consequently, in this situation where the input shaft 11 is rotating at velocity $\omega$ and no acceleration/deceleration is applied to either of the modulators, the resultant counter rotation of the first transmission shaft 30 and the second transmission component 60 results in no rotation being transmitted through the gearbox (although each of the modulators will rotate at a speed of magnitude $|\omega/3|$ as described above). In other words, in this situation the output speed/input speed ratio for the gearbox is zero. A graphical summary of the rotational speeds and directions of the various components in this situation is given in FIG. 7.

Now consider an alternative situation (represented graphically in FIG. 8) where:
 a sufficiently large retarding torque is applied to first modulator 80 to fix first modulator 80 in position (i.e. to prevent it from rotating at all),
 a torque is applied to second modulator 90 such that second modulator 90 rotates at a constant angular speed of magnitude $|\omega/2|$ (in the direction shown in FIG. 8), and
 the input shaft is rotating at the same angular velocity $\omega$ as above.

In this alternative scenario, it will be seen that the engagement of the input gear 12 with flywheel ring gear 21 will again cause flywheel component 20 to rotate at an angular velocity of $\omega/3$ about its own principal cylindrical axis. However, because first modulator 80 is now fixed, first transmission shaft 30 also becomes fixed. Therefore, input side sun gear 32 is fixed. Consequently, the rotation of flywheel component 20, and the engagement between flywheel planet gear 22 and input side sun gear 32, will cause the flywheel planet gear 22 to also move in an orbit around the input side sun gear 32. The velocity of this orbital motion will be $-\omega/3$ as shown by the arrow in FIG. 8.

Figure 8:
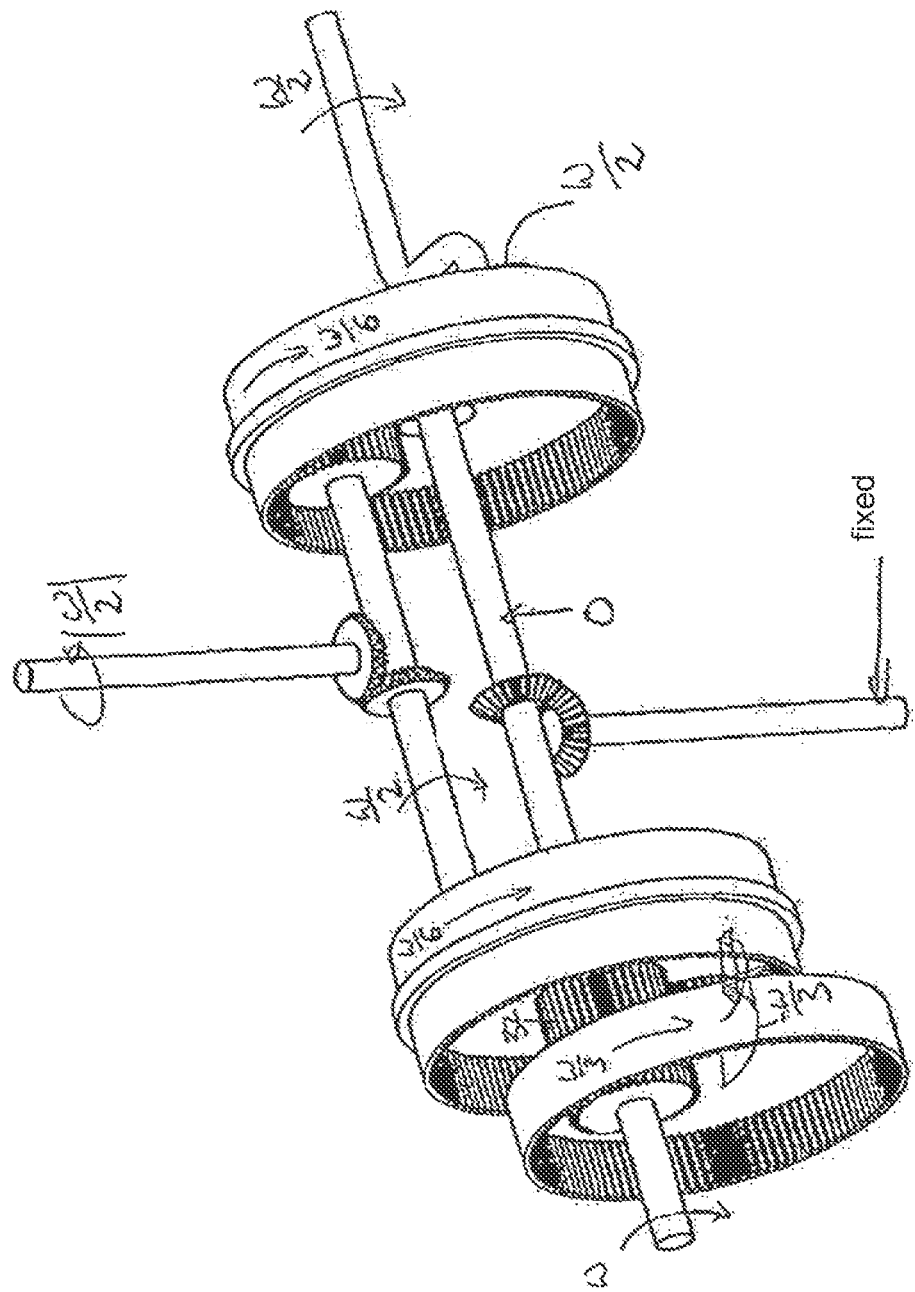

Meanwhile, because second modulator 90 is rotating at a constant angular speed of magnitude $|\omega/2|$ in the direction shown in FIG. 8, the second transmission shaft 50 is caused to rotate at velocity $\omega/2$. This causes both first transmission component 40 and second transmission component 60 to rotate in the same direction. However, as above, the rotation of the first and second transmission components will be slower than the rotation of second transmission shaft 50 because the diameter of each of the transmission components' ring gears is three times larger than the diameter of the gears on either end of second transmission shaft 50. Hence, the first transmission component 40 and the second transmission component 60 will both rotate with velocity $\omega/6$.

Therefore, in this alternative situation, the output side sun gear 33 will be stationary (because the entire first transmission shaft 30 is stationary), whereas the second output side ring gear 62 is rotating at velocity $\omega/6$ (because the entire second transmission component 60 is rotating at velocity $\omega/6$).

Next, it will be recalled that output planet gear 72 engages with both output side sun gear 33 and second output side ring gear 62. Therefore, the overall/net rotation of output planet gear 72 (and hence the overall/net rotation of output shaft 71) is determined by the combined interaction of output side sun gear 33 and second output side ring gear 62 with output planet gear 72. In this case, the rotation of second output side ring gear 62 will cause the output planet gear 72 to rotate about its own principal cylindrical axis at a velocity of $\omega/2$ (i.e. at three times the speed of the ring gear 62 but in the same direction). However, this also means that output planet gear 72 must rotate in an orbit about output side sun gear 33 (because output side sun gear 33 is fixed against rotation). Therefore, not only does output planet gear 72 rotate about its own principal cylindrical axis with a velocity of $\omega/2$, but it also moves in an orbit about output side sun gear 33 with an orbital velocity of $\omega/2$. Consequently, this orbital motion of output planet gear 72 causes output shaft 71 to rotate at a velocity of $\omega/2$.

Therefore, in this alternative situation, the effect of fixing the first modulator 80 against rotation and rotating second modulator 90 at a speed of $|\omega/2|$ (as shown in FIG. 8), while the input shaft rotates at velocity $\omega$, has the effect of causing output rotation in the same direction as the input rotation, but at one third of the speed. Hence, it causes output rotation at velocity $\omega/2$, or put another way, it gives the gearbox and output speed/input speed ratio of 2.

Figure 9:
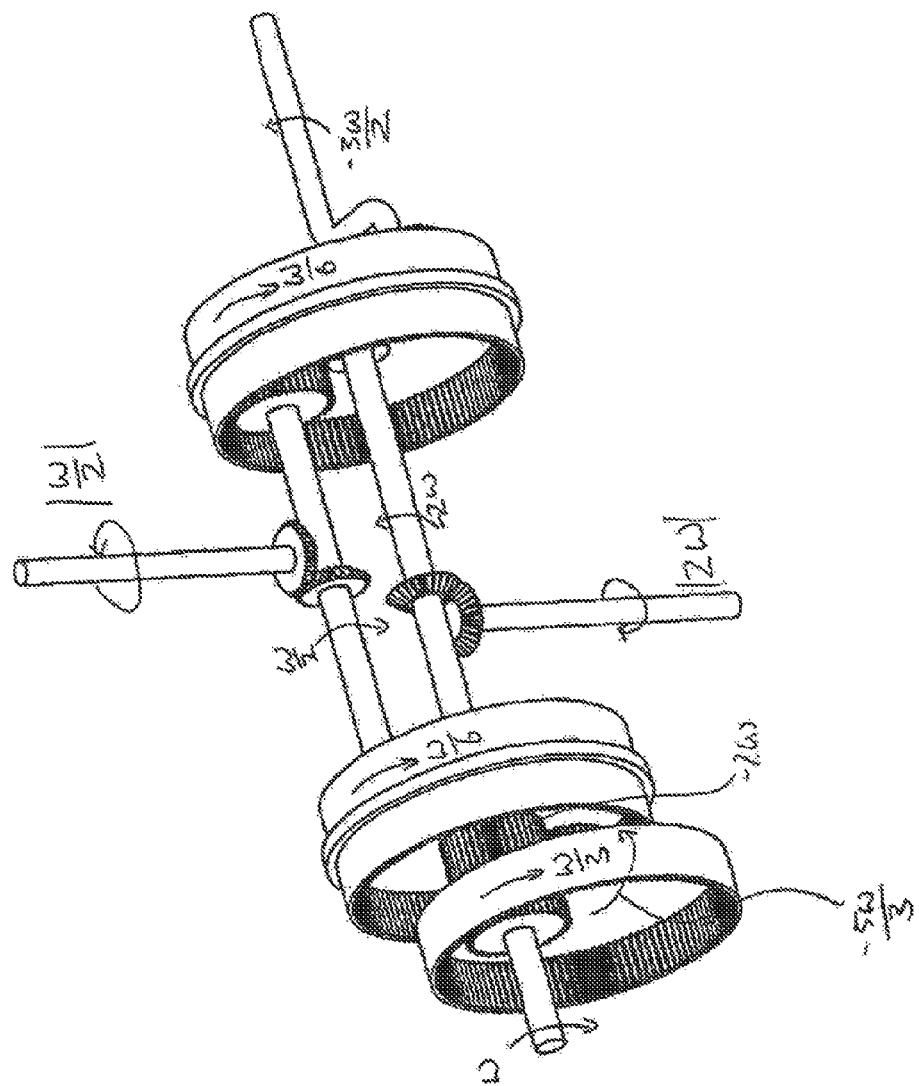
Figure 10:
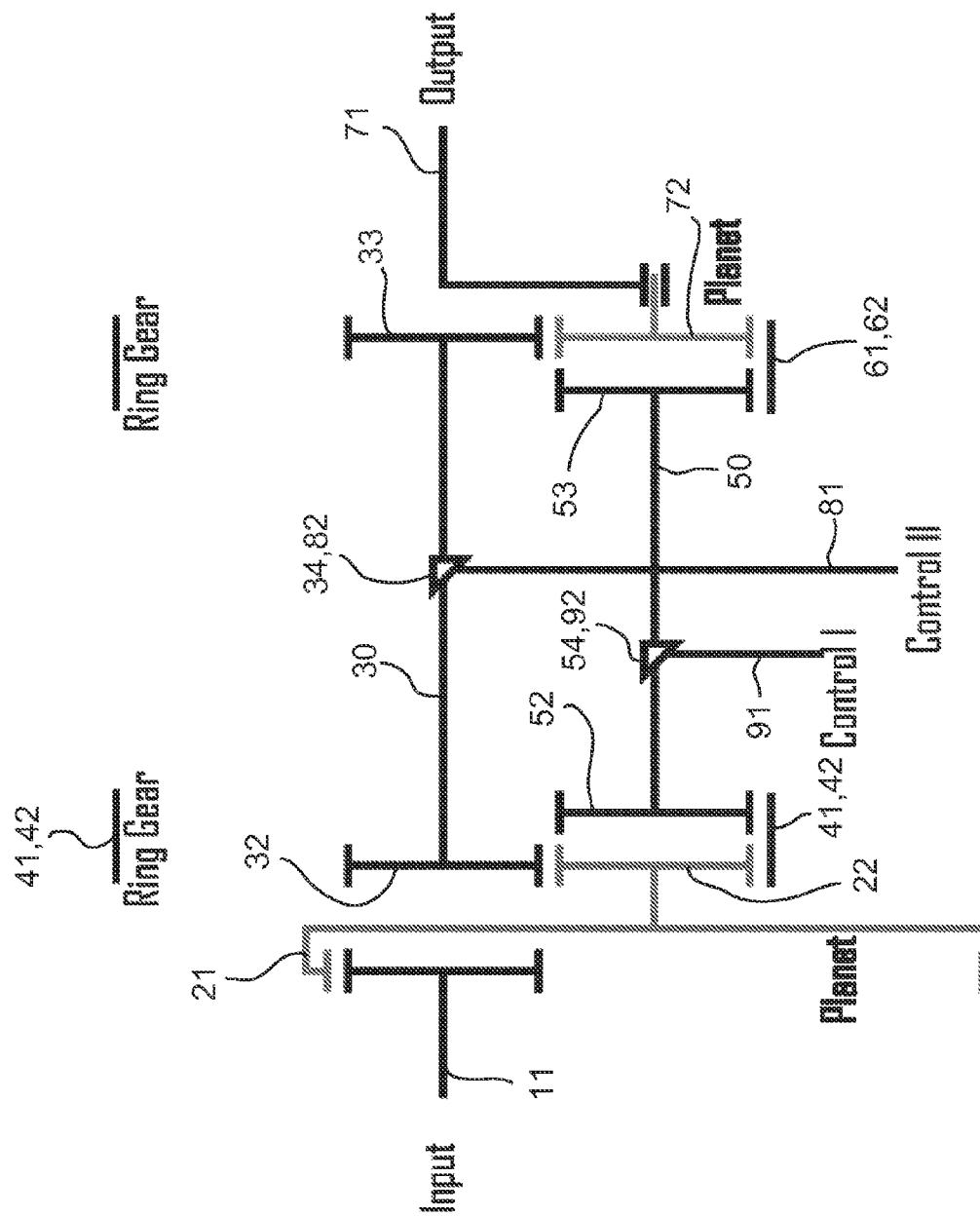
FIG. 10 is a schematic view of a transmission system according to an embodiment of the present invention.
Figure 11:
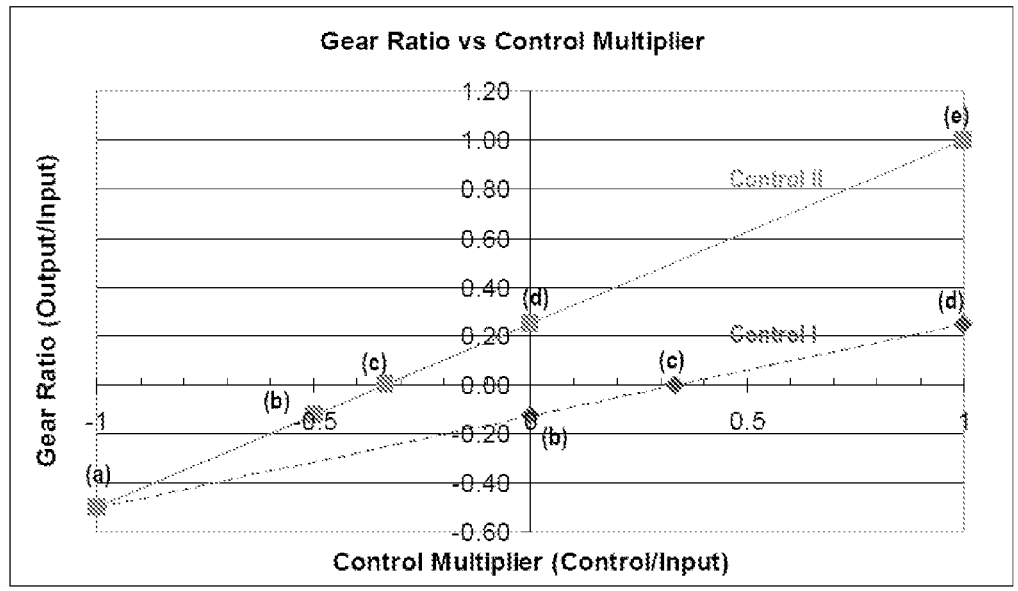
FIG. 11 is a graphical representation of the information in table 1.
Figure 12:
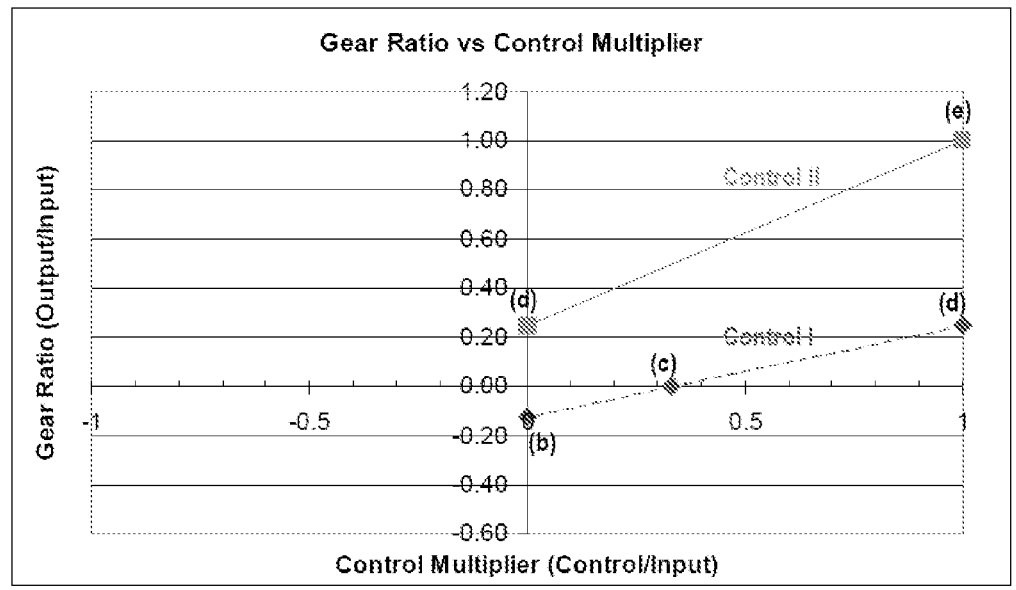
FIG. 12 is a graphical representation of a multi-Control strategy.

FIG. 9 schematically illustrates a further alternative example situation in which:
 a torque is applied to first modulator 80 such that first modulator 80 rotates at a constant angular speed of magnitude $|2\omega|$ (in the direction shown in FIG. 9),
 a torque is applied to second modulator 90 such that second modulator 90 rotates at a constant angular speed of magnitude $|\omega/2|$ (in the direction shown in FIG. 9), and
 the input shaft is rotating at the same angular velocity $\omega$ as above.

In this further alternative scenario, it will be seen that the engagement of the input gear 12 with flywheel ring gear 21 will again cause flywheel component 20 to rotate at an angular velocity of $\omega/3$ about its own principal cylindrical axis. However, because first modulator 80 is now rotating at a speed of $|2\omega|$, first transmission shaft 30 therefore rotates at a velocity of $-2\omega$. Therefore, input side sun gear 32 rotates at $-2\omega$. Consequently, the rotation of flywheel component 20, and the engagement between flywheel planet gear 22 and input side sun gear 32, will cause the flywheel planet gear 22 to also move in an orbit around the input side sun gear 32. The velocity of this orbital motion will be $-2\omega+\omega/3=-5\omega/3$ as shown by the arrow in FIG. 9.

Meanwhile, because second modulator 90 is rotating at a constant angular speed of magnitude $|\omega/2|$ in the direction shown in FIG. 9, the second transmission shaft 50 is caused to rotate at velocity $\omega/2$. This causes both first transmission component 40 and second transmission component 60 to rotate in the same direction. However, for the same reasons as in the previous example above, the rotation of both transmission components will be at a velocity of ω/6 (i.e. one third of the velocity of the second transmission shaft 50).

Therefore, in this further alternative situation, the output side sun gear 33 will be rotating at a velocity of −2ω (because the entire first transmission shaft 30 is rotating at that velocity), whereas the second output side ring gear 62 is rotating at velocity ω/6 (as explained in the previous paragraph).

Next, as noted above, the overall/net rotation of output planet gear 72 (and hence the overall/net rotation of output shaft 71) is determined by the combined interaction of output side sun gear 33 and second output side ring gear 62 with output planet gear 72. In this further case, the net effect of the engagement of output planet gear 72 with second output side ring gear 62 (which is rotating at ω/6) and with output side sun gear 33 (which is rotating at −2ω) is to cause rotation of output planet gear 72 about its own principal axis at a velocity of ω/2 (i.e. three times the velocity of ring gear 62), and also cause orbital movement of output planet gear 72 at an orbital velocity of −2ω+ω/2=−3ω/2.

In other words, in this further alternative situation, the effect of rotating the first modulator 80 at a speed of |2ω| (as shown in FIG. 9) and rotating second modulator 90 at a speed of |ω/2| (as shown in FIG. 9), while the input shaft rotates at velocity ω, is to cause output rotation of output shaft 71 in the opposite direction to the input rotation, but at one and a half times the speed. Hence, in this situation, the output/input ratio of the gearbox is −3/2=−1.5.

These examples demonstrate that changing the combination of acceleration/retarding torques on the first and second modulator can have the effect of varying the speed and direction of the gearbox's output shaft relative to the speed of the input shaft. Furthermore, it will be understood that the acceleration/deceleration applied to the modulators (or at least one of them) can be varied continuously, and therefore a continuously variable input output ratio is achievable for the gearbox.

Alternatively, in some instances, it may not be possible to continuously vary the acceleration/deceleration applied to the modulators (or one of them). Instead, one or both modulators may be capable of a large number of discrete rotational speeds, possibly in one or both rotational directions. In these instances, there should be more than 6 different rotational speeds possible for at least one of the modulators, although a greater number speeds would be even more preferable (basically, the more the better). The different discrete speeds should also be fairly close to one another (i.e. there should not be large gaps between discrete speeds). Having closely spaced discrete speeds enables reasonably fine adjustments to be made in the output/input ratio of the transmission system. The ability to make reasonably fine adjustments to the transmission output/input ratio will help to alleviate the problem discussed in the background section above whereby, with existing gearboxes which provide very few discrete ratios, it is necessary to run the prime mover at a higher or lower operating speed than is optimal because the transmission system cannot provide a transmission ratio that would allow a desired output speed to be generated with the engine running at the ideal speed. By providing a large number of discrete modulator speeds close together, the transmission system of the present invention may at least provide a transmission ratio which approximates the ideal transmission ratio.

Those skilled in the art will recognize that various changes and modifications may be made to the particular embodiment described without departing from the spirit and scope of the invention.

The invention claimed is:

1. A transmission system, comprising:
rotation input means for delivering an input rotation into the transmission system, the rotation input means having a first input gear fixedly mounted thereon such that the first input gear rotates with, and at the same speed as, the rotation input means;
a first ring gear adapted to engage with the first input gear on a first side of the first ring gear such that rotation of the rotation input means causes rotation of the first ring gear;
a first output planet gear located coaxially with the first ring gear on a second side of the first ring gear;
a second ring gear in engagement with the first output planet gear;
a first sun gear mounted on a first end of a first transmission shaft and engaging the first output planet gear;
a third ring gear mounted coaxially with the second ring gear for corresponding rotation;
a second output gear engaging with the third ring gear and mounted on a first end of a second transmission shaft;
a second input gear mounted on a second end of the second transmission shaft;
a fourth ring gear mounted coaxially with the first transmission shaft and engaging the second input gear;
a fifth ring gear mounted coaxially with the first transmission shaft;
rotation output means for delivering an output rotation from the transmission system;
a second planet gear engaging with the fifth ring gear and also with a second sun gear, the second sun gear located on a second end of the first transmission shaft; and
rotatable modulation means for engaging at least one of the first transmission shaft or the second transmission shaft wherein a rotational velocity of the rotatable modulation means can be selectively varied to control a speed and/or direction of the output rotation relative to a speed and/or direction of the input rotation.

2. The transmission system according to claim 1, wherein variation of the rotational velocity of the rotatable modulation means creates different ratios of the speed and/or direction of the input rotation relative to the speed and/or direction of the output rotation.

3. The transmission system according to claim 1, wherein the rotation input means includes a prime mover.

4. The transmission system according to claim 3, wherein the prime mover is adapted for connection to the rotation input means of the transmission system.

5. The transmission system according to claim 1, wherein the rotation input means is an input shaft.

6. The transmission system according to claim 1, wherein the rotatable modulation means is adapted to adopt more than six discrete rotational velocities.

7. The transmission system according to claim 1, wherein the rotational velocity of the rotatable modulation means is selectively and continuously variable.

8. The transmission system according to claim 1, wherein the rotatable modulation means includes a rotatable shaft.

9. The transmission system according to claim 1, wherein the rotatable modulation means is one of two rotatable modulation means, and both of the first and second transmission shafts are each provided with a separate one of the two rotatable modulation means.

10. The transmission system according to claim 1, wherein the first ring gear has a diameter which is greater than a diameter of the first input gear.

11. The transmission system according to claim 1, wherein rotational velocity, namely a speed and/or direction of the rotatable modulation means affects variation in the speed and/or direction of the output rotation relative to the input rotation speed and direction.

12. The transmission system according to claim 1, wherein a continuously variable accelerating or retarding influence applied to or by the rotatable modulation means results in acceleration or retardation of a rotation of at least one of the first and second transmission shafts, the rotatable modulation means thereby allowing continuous variation of the speed and/or direction of the output rotation relative to the input rotation speed and direction.

13. The transmission system according to claim 1, wherein the rotatable modulation means is adapted to adopt more than ten discrete rotational velocities.

14. The transmission system according to claim 1, wherein the rotatable modulation means is adapted to adopt more than fifty discrete rotational velocities.

* * * * *